United States Patent [19]

Ramming

[11] Patent Number: 4,488,441
[45] Date of Patent: Dec. 18, 1984

[54] APPARATUS FOR SIMULTANEOUS MEASUREMENT OF MUTUALLY PERPENDICULAR FORCES AND MOMENTS

[75] Inventor: John E. Ramming, Davis, Calif.

[73] Assignee: JR3, Inc., Woodland, Calif.

[21] Appl. No.: 485,589

[22] Filed: Apr. 15, 1983

[51] Int. Cl.³ .............................................. G01L 5/16
[52] U.S. Cl. ................................................ 73/862.04
[58] Field of Search ........... 73/862.04, 862.05, 862.06, 73/862.07

[56]         References Cited
         U.S. PATENT DOCUMENTS
    4,094,192  6/1978  Watson et al. ................. 73/862.04
         FOREIGN PATENT DOCUMENTS
     125426   9/1980  Japan ............................... 73/862.04

OTHER PUBLICATIONS

Fock, K. et al., Multi-Component Digital . . . Robots, Finommech-Mikrotech (Hungary), vol. 19, No. 10, Oct. '80, pp. 289-296.

Primary Examiner—Jerry W. Myracle
Attorney, Agent, or Firm—Burns, Doane, Swecker & Mathis

[57] ABSTRACT

A device suitable for controlling a robot operating arm includes a drive link between a driving member and a driven member determines forces and moments acting to resist movement therebetween. The drive link has two parallel plates connected together by three or more bridge members each having an arch configuration in at least one edge. Strain gauges on the bridge members detect mechanical forces and moments acting on the plates. Feedback of the strain gauge signals are used to control vector forces applied by the driving element to the work site of the operating arm.

7 Claims, 4 Drawing Figures

APPARATUS FOR SIMULTANEOUS MEASUREMENT OF MUTUALLY PERPENDICULAR FORCES AND MOMENTS

BACKGROUND OF THE INVENTION

Field of the Invention

This invention relates to a method of and an apparatus for measuring forces or moments, or both, in at least three mutually perpendicular directions. More particularly, this invention relates to a method of controlling a robot arm or operator in response to force or moment measurements in a plurality of directions on such robot arm or operator when it encounters resistance to movement in a given direction. As used herein, a "moment" is a torque, twist, or rotary force acting around an axis in a given direction.

In automatically controlled apparatus and particularly in robotic machinery, it is desirable to monitor the forces and moments being generated at the work site between the motive or drive power element and the driven element of the operating unit, frequently referred to as an "arm". Force and moment measurements and feedback (control in response to such measurements) have heretofore been accomplished by a number of methods. For example, individual axial forces have been measured with a standard moment measuring loadcell. For simultaneous measurement of more than one load or moment, single force or single moment loadcells have been assembled with suitable mechanical devices to achieve the required loading measurements.

SUMMARY OF THE INVENTION

In a broad aspect, the present invention provides a single compact power transmission and sensing unit for simultaneously measuring more than one force and/or moment. In a preferred form of apparatus the present invention provides a method of measuring forces and moments acting about three mutually perpendicular directions.

In such preferred form the sensing of axial forces and moments about said axis are measured through a pair of generally parallel plate or base members which are joined by at least three bridge members circumferentially spaced around the periphera of said plates and generally normal thereto. Desirably, such bridge members are in the form of curved arch segments with their axes of the arch portion parallel to the plane of the plates and spaced at right angles to each other on circumferential edges of said plates. Strain gages mounted on one or more surfaces of said arch segments detect forces or moments representing direction and amplitude of distortion by movement of one plate relative to the other in any direction. Such mechanical distortion mechanically deforms the strain gages to generate electrical signals representative of the direction and amplitude of the mechanical forces and moments between the driving and driven plates. The electrical signals may then form a feedback loop to control power applied to the drive plate of said pair and through said bridge members and the driven plate to the operator arm.

Further objects and advantages of the present invention will become apparent from the following detailed description of the invention with reference to the accompanying drawings which are made part of this specification and in which:

PREFERRED EMBODIMENTS OF THE INVENTION

Figure 1:
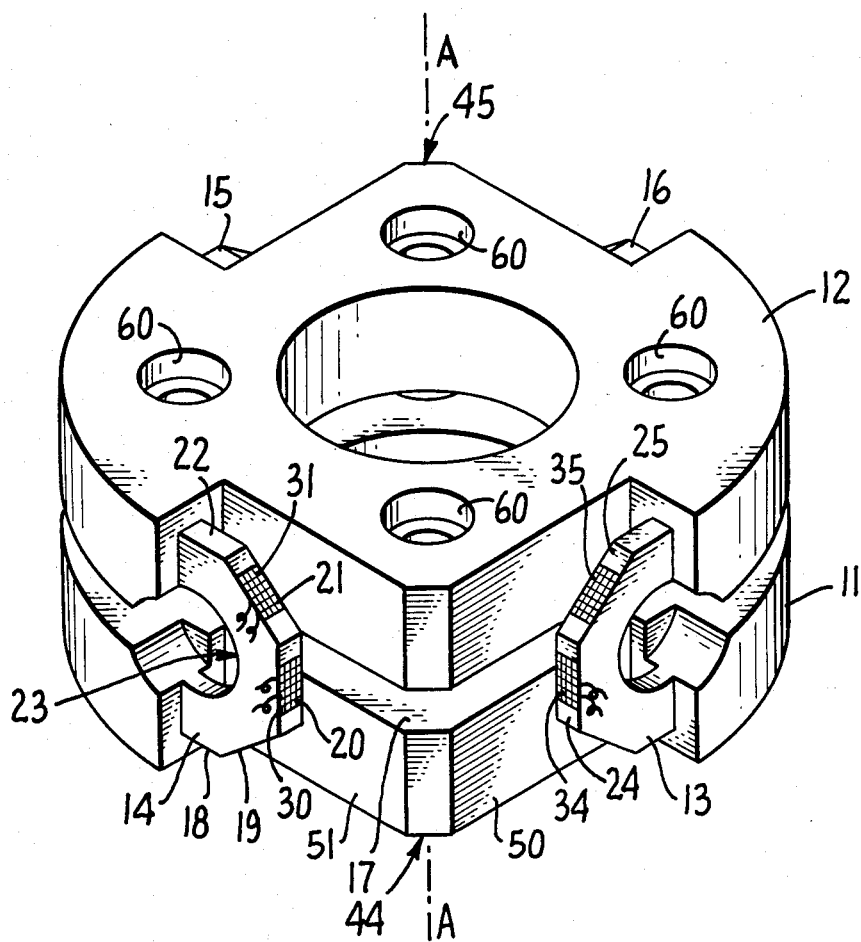
FIG. 1 is a perspective view of the present invention applied to a unit suitable for transmitting and measuring forces and moments between drive and driven plates.

A general arrangement of the apparatus of the present invention is shown in FIG. 1 of the drawings. Two generally parallel plates 11 and 12 are shown axially spaced apart by bridge members formed as curved or arch segments 13, 14, 15, and 16. While such bridge members may be formed as rods or other shapes, it has been found that the relatively thin flat plates having at least one edge formed as an arch approaching a semicircle is particularly effective to respond to both axial forces and turning moments applied therethrough. The curved arch segments 13, 14, 15 and 16 are made integral with the end plates and represent the only connection between plates 11 and 12 and form gap 17 between the two plates. Such spacing by the curved arch segments permits the plates to move relative to each other with all distortion in such movement being accommodated by segments.

In accordance with the present invention parallel plates 11 and 12 are interchangeably driving and driven members for transmitting a desired mechanical force from a power source connected to one plate and a work arm connected to the other plate. Such a work arm may be a robotic operator to locate and insert an element into apparatus being assembled by the arm. Alternatively, the operating work arm may perform a manipulation or work step, without exceeding a predetermined force in any given direction or at any given angle thereto. Plates 11 and 12 may be secured to the drive member or driven member by machine screws inserted through the four holes 60.

When forces and moments are applied to plates 11 and 12, curved arch segments 13, 14, 15 and 16 connecting the plates undergo independent deformations in order to transmit force and moment loads between the two plates. The independent deformations of each curved arch will result in strains throughout the curved arch, both normal and parallel to the plane of anchor points of said arch and twisting or turning moments between such anchor points. By measuring the resulting strains at suitable locations along the arch of said segments, the forces which are acting on the two plates can be determined.

In FIG. 1, curved arch segment 13 shows six suitable locations 18, 19, 20, 21, 22 and 23 for such strain measuring means. Through the selection of proper strain measuring locations on each of four segments, such as 13, 14, 15 and 16 shown in FIG. 1, each of three forces and three moments acting on the plates about three mutually perpendicular directions are determined.

In the arrangement of FIG. 1, forces and moments acting on the plates 11 and 12 are determined by measuring the strains on the outer surface of curved arch segments 13 and 14, such as surfaces 20, 21, 24 and 25.

The relationship between these forces, moments, and strains will be determined by individual calibration of each strain gage.

As indicated, forces are measured by strain gages 30 and 31 on surfaces 20 and 21, and 34 and 35 on surfaces 24 and 25. Such gages are well known to persons skilled in the art, and generally consist of thin insulated electrical wires that are glued or otherwise bonded to a surface of an element that is strained. The gages change their length in accordance with changes in length of the material to which they are attached. The change in length of each gage causes a change in its electrical resistance that is measured by means of a sensitive resistance measuring technique, such as a Wheatstone bridge circuit.

As further shown in FIG. 1, the curved arch segments are desirably grouped in pairs. One curved arch pair 13 and 14 is shown at the bottom of FIG. 1 and the other curved arch pair 15 and 16 is shown at the top of FIG. 1. The curved arches within each pair point to a common corner of the end plates; for example, corner 44 for the curved arch pair 13 and 14 and corner 45 for the curved arch 15 and 16. Corners 44 and 45 are formed by the flat areas such as 50 and 51 in plate 11, cut in the peripheral edges of plates 11 and 12. As indicated, bridge or arch segments 13 and 14 are radially displaced relative to axis A—A of the unit and from surfaces 50 and 51 so that lateral thrust or twists between plates 11 and 12 may be sensed by the connecting segments.

Figure 2:
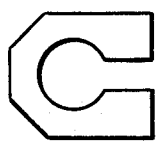
FIG. 2 is a plan view of a curved arch segment useful in the arrangement of FIG. 1 having five plane outer surfaces.
Figure 3:
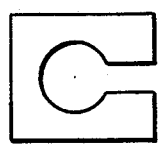
FIG. 3 is a plan view similar to FIG. 2 in which the curved arch segment has three plane outer surfaces.
Figure 4:
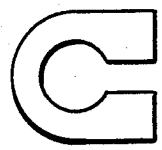
FIG. 4 is a view similar to FIG. 2 in which the curved arch segment has a curved outer surface.

FIG. 1 shows the present invention with four curved arch segments, each having five plane outer surfaces. It is possible to use two or more outer plane surfaces or a circular surface opposite other curved arch configurations, including the shapes shown in FIG. 2, FIG. 3 and FIG. 4.

In application of the force and moment measuring system of the present invention between robotic drive means and an operating arm, it will be apparent that the rigidity of the plates 11 and 12 and the deformation of arch segments 13, 14, 15 and 16 relative to applied and reactive forces will determine the external dimensions of the plates and bridge elements. For example, where several foot-pounds force, such as inserting a one-inch bolt into an automobile part, is to be transmitted, the rigidity of the bridge segments may be several times that of an arm assembling elements requiring only a few ounce-inches of work, such as inserting a microchip into an electronic circuit board.

Although only a few specific embodiments of apparatus have been described, various modifications and changes may be made in both the method and apparatus aspects of the present invention without departing from the teaching thereof. Accordingly, the invention is not limited to the embodiment so described, but only by the spirit and scope of the appended claims.

What is claimed is:

1. An apparatus for measuring forces or moments, or both, in at least three mutually perpendicular directions comprising two rigid plate members that are generally parallel and spaced apart by at least three curved arch segments forming a drive connection therebetween, strain measuring means mounted on each of said arch segments to detect mechanical deformation of each of said segments due to forces and moments imposed between said plates and means for converting said deformations into electrical signals representative of said forces and moments between said plates.

2. A device as described in claim 1 in which each arch segment is shaped with a circular inner surface and a plurality of planar outer surfaces, with two of said outer surfaces making an angle ranging from 30 to 50 degrees from the plane formed by the base of the arch, and strain measuring means mounted on both the circular inner surface and on at least one of the planar outer surfaces.

3. A device as described in claim 1 in which the arch of said segments are shaped with a circular inner surface and three planar outer surfaces, two of said outer surfaces making an angle ranging from 0 to 50 degrees from a plane formed by the base of the arch, and said strain measuring means is mounted on one of said planar outer surfaces.

4. A device as described in claim 1 in which said arch segments are shaped with a circular inner surface and a circular outer surface with strain measuring means mounted on both the inside surface of said arch and on the outer surface of said arch segment.

5. A device as described in claim 1 in which said arch segments are grouped in two pairs with the arches within each pair spaced between 80 and 100 degrees apart around said plates and with the convex portion of each arch segment pointing to a common and adjacent corner of said plates.

6. A device for transmission and measurment of forces and/or moments applied therethrough comprising at least two rigid plates that are substantially parallel to each other and are spaced apart and mutually interact through at least three curved arch segments having strain measuring means mounted on a surface in a plane generally parallel to the curved surface of the arch portions therein to permit strain measurement as a result of deformaton of said arch segment due to forces and moments imposed on said plates.

7. A device comprising two bodies spaced apart and connected by a plurality of bridge segments having curved arches formed on one side edge thereof, and strain measuring means mounted on the opposite edges of each of said segments to measure mechanical deformation of each segment due to forces and moments imposed on said bodies.

* * * * *